No. 716,630. Patented Dec. 23, 1902.
A. EIMER.
CRUCIBLE.
(Application filed Mar, 24, 1902.)
(No Model.)
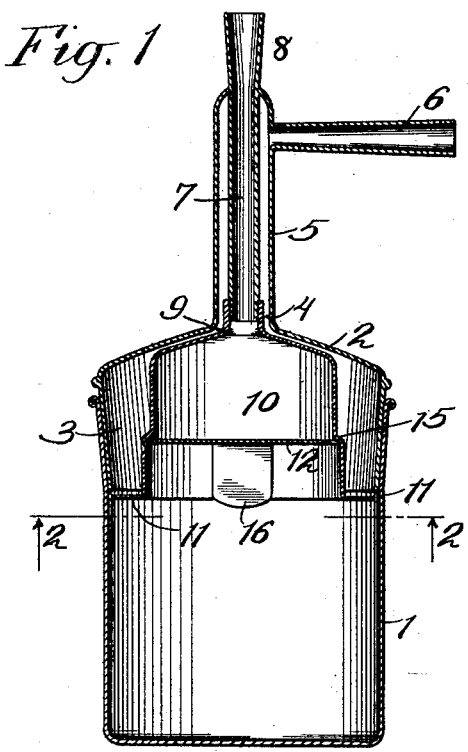
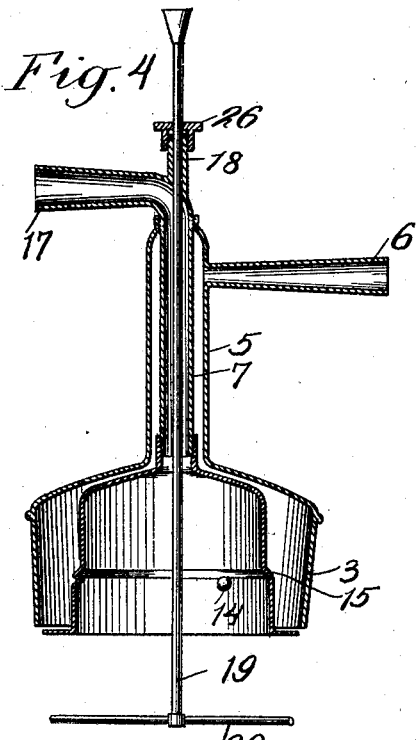
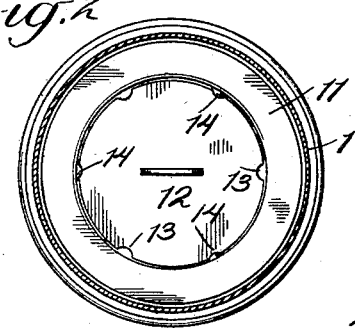
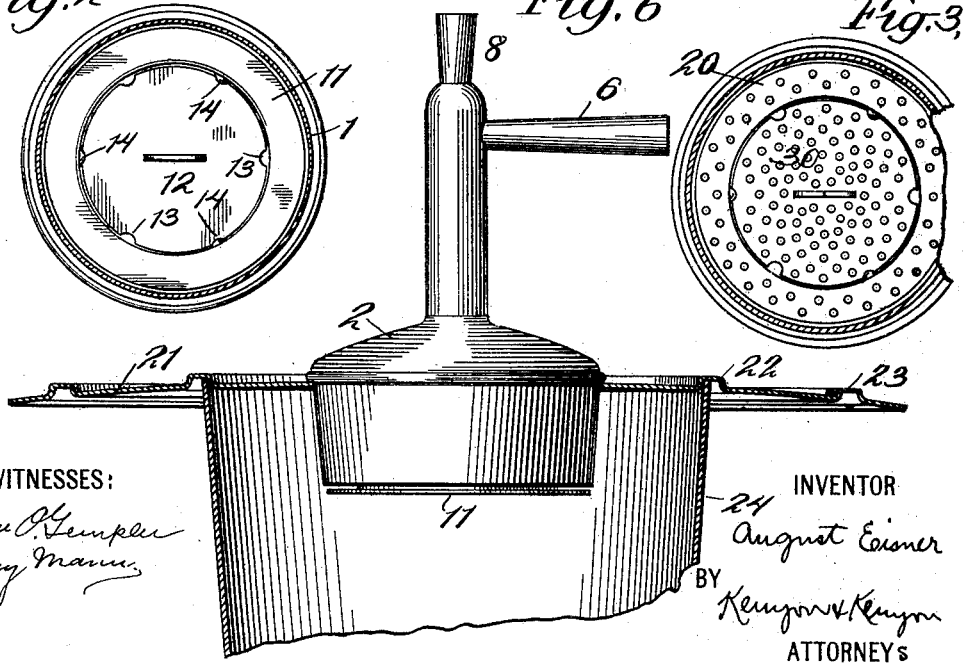
WITNESSES:
John O. Gempler
Sidney Mann
INVENTOR
August Eimer
BY
Kenyon & Kenyon
ATTORNEYS

UNITED STATES PATENT OFFICE.

AUGUST EIMER, OF NEW YORK, N. Y.

CRUCIBLE.

SPECIFICATION forming part of Letters Patent No. 716,630, dated December 23, 1902.

Application filed March 24, 1902. Serial No. 99,643. (No model.)

*To all whom it may concern:*

Be it known that I, AUGUST EIMER, a citizen of the United States, and a resident of the city, county, and State of New York, have invented certain new and useful Improvements in Crucibles, of which the following is a specification.

This invention relates to a crucible or receptacle used for the purpose of chemical treatment and analysis; and its object is to provide a receptacle wherein a substance may be heated and at the same time operated upon by any desired fluid or powder. The receptacle is so arranged that a fluid or powder may be directed or blown to the substance which is being heated, and the resultant compound may be carried away and collected in a receiver or other vessel.

The invention consists, first, in the combination, with a receptacle, of a means for directing incoming fluids to and around the contents of the receptacle. There may also be provided a means for collecting the escaping compounds.

The invention also consists in the combination, with the receptacle, of a cover containing the means for directing the flow of an incoming fluid in the receptacle. This means may consist of any body which will cause the fluid to flow toward the walls of the receptacle.

The invention also consists, in the combination of a receptacle with a means for preventing solid bodies from escaping from the receptacle and yet which will permit gases or fluids to flow from the receptacle.

The invention also consists, in addition to the parts named, of a means for stirring the contents of the receptacle.

The invention also consists of a means for supporting in a receptacle of any size the device for directing the flow of the fluid.

The invention also consists in other features of construction and combination of parts hereinafter described and claimed.

The invention is illustrated in the accompanying drawings, wherein the same reference-numerals indicate similar parts of the invention.

In the drawings, Figure 1 illustrates a vertical sectional view of a crucible, showing the arrangement of the connecting-tubes and the means for directing the flow of a fluid in the receptacle. Fig. 2 illustrates a sectional view taken along the view-line 2 2, Fig. 1, showing the means for directing the flow of the fluid in the receptacle. Fig. 3 is a modified form of the means for directing the flow of the fluid. Fig. 4 illustrates a modified arrangement of the tubes connected with the receptacle and also a mixer for stirring the contents of the receptacle. Fig. 5 illustrates the foot of the mixer. Fig. 6 illustrates a top adapted to be applied to receptacles of different sizes and adapted to support the means for directing the flow of the fluid in the receptacle.

In Fig. 1, 1 indicates the receptacle, which may be of any desired shape and made of platinum or any desired material. 2 indicates the top or cover of the receptacle. The top has a conical flange 3, which is ground or roughened or otherwise constructed to accurately fit the receptacle, so as to prevent the leakage of any liquid or gas that may be used. The cover may be used to coöperate with the other parts of the invention to provide a means for radially directing the flow of an incoming fluid in the receptacle. An opening 4 is provided in the center of the cover, which is connected by a tube 5, having a conical-shaped opening 6, adapted to make connection with any tube, such as a glass tube or a rubber tube. The tube 5 is closed at the top. It also supports the means for directing the flow of fluids in the receptacle or of directing the movement of powders blown into the receptacle for the chemical treatment of substance contained in the receptacle.

The means for directing the flow of the fluid in the receptacle is supported by a tube 7, which is sealed in or screwed into the top of the tube 5. In the upper end of the tube 7 is an opening 8, which is adapted to make connection with a tube leading to a receiver or other vessel. The tube 7 extends down through the tube 5 to the opening 4 in the cover. The tube 7 supports the means for directing the flow of a fluid in the receptacle at its lower end. The means is so located relative to the cover or to the walls of the receptacle as to cause a fluid to be directed toward the wall of the receptacle. It may be of any desired shape to accomplish this purpose. I have preferably shown a bell-shaped body which provides a means of directing the fluids or powders entering the receptacle through one of the tubes in the cover and for collecting the outgoing substances for the other tube. The bell 10 is secured to the lower end of the tube 7, and its lower edge 11 is located just below the lower edge of the conical flange 3 of the cover and forms therewith an annular opening which radially directs the flow of a fluid entering the receptacle along the walls of the receptacle to its bottom. The escaping substances formed by the reaction of the entering fluids or powders with the substance contained in the receptacle rise upward through the center of the receptacle and are collected by the inner wall of the bell-shaped body and pass out through the tube 7. It will be seen by this arrangement of the parts of the cover that the incoming fluid, such as oxygen or any other substance, will be heated as it passes down the tube 5 by the escaping fluids passing through the tube 7. The entering fluid will then pass down around the outside of the bell 10 and be radially directed toward the wall of the receptacle 1 by means of the annular nozzle formed by the position of the bell with respect to the receptacle. The fluid will then pass down the wall to the contents of the receptacle, which may be undergoing other chemical reactions, such as that produced by heat. The resultant fluid produced by the reaction of the entering fluid will rise to the top of the cover and escape through the bell. By this arrangement the necessity of a gasket for producing an airtight connection between the stopper or cover and the receptacle is entirely obviated, and, furthermore, all water-jackets and cooling-chambers to protect such a gasket or any sealing means are entirely avoided. It also permits of a very accurate analysis of the contents of the receptacle, since no additional elements that may be produced by the chemical action upon the sealing substance can enter into the analysis. If, for example, the sealing means consists of a rubber gasket or a cement of any kind and the entering gas is air or oxygen and the receptacle is subject to a very high heat by an electric or other furnace, the chemical reaction of the oxygen on the rubber will cause a decomposition of the gasket, and if an analysis is being made of carbonaceous material the carbon of the gasket will add to the results which should have been obtained from the contents of the receptacle alone and cause inaccurate and uncertain results. The same is true with any other cement or substance that may be used for securely fitting the cover of the receptacle.

For preventing too great a flow of the agent through the receptacle I have provided a means which when inserted in the directing means for the fluids forms a narrow annular opening through which the agent escapes. When some substances are heated, they are reduced to the form of an ash, which may escape from the receptacle by the movement of the incoming fluid. This means also prevents the escape of any of the solid material which may be placed in the receptacle. It consists of a valve-disk 12, located on the inside of the bell 10. The disk has a plurality of notches 13, which are adapted to register with the same number of lugs 14, located on the interior of the bell and just below a ridge 15, which is spun into the bell. The disk has a handle 16 for inserting it in the bell 10. When the disk is to be inserted in the bell, the disk is placed in the bell so that notches 13 in the cover register with the lugs 14. The disk is raised above the lugs and then turned so as to rest upon the lugs 14 when released. The ridge 15 prevents the disk from being forced upward by the movement of the circulating fluids.

In Fig. 3 is shown a modified form of the means for directing the flow of incoming fluids. In this form the annular opening 11 is closed by the flange 29. The flange 29 and the disk 30 have a plurality of small holes to allow fluids to sprinkle the interior of the receptacle or to become vaporized upon entering the receptacle. The disk 30 also has a plurality of small holes to allow fluids to escape and to prevent solid bodies from escaping. The space inside the bell and the space between the bell and the cover may be filled with asbestos fiber, platinum, gauze, glass, wool, and like substance for properly filtering the fluids entering or leaving the receptacle. The direction of the fluid may also be reversed—that is, it may enter by the tube 7 and leave by the tube 5—and yet be within the scope of my invention.

In the modification shown in Fig. 4 the upper end of tube 7 is turned at right angles to the axis of the tube, as shown at 17. The upper end of the tube 7 is also provided with a bearing 18 for the handle 19 of a mixer or agitator 20. The bearing may be made airtight by any well-known means for preventing any of the escaping fluids of the receptacle from passing out of the tube 7, as by a cap 26, containing packing material. A similar cap may also be used to close the upper end of the tube 7 when the mixer is not in use. The mixer consists of any well-known stirring means having a handle extending from the outside of the cover of the receptacle to the bottom of the receptacle. The handle has a foot 20, located at right angles thereto. The foot is adapted to stir the contents of the receptacle by merely turning the handle about its axis. The handle and foot are made hollow, and a tubing may be connected to the upper end of the handle of the mixer and also with a source of supply of a fluid. The fluid may be then forced through holes in the foot for causing a perfect mixture of a fluid with the substance in the receptacle.

In Fig. 6 is shown a cover adapted to be used with receptacles or crucibles of different sizes. This cover 21 is of disk shape and has a plurality of circular ridges 22 and 23. The ridges have a rectangular cross-section and are adapted to accurately fit receptacles of different sizes. Each ridge may be used in connection with receptacles of two sizes by forming the ridge with slanting sides, so that when it is placed upon a receptacle the upper edge of the receptacle will engage with the inner wall of the ridge, and when the cover is turned over the outer wall of the ridge may be used for accurately fitting with the edge of a receptacle of a size larger. There is an opening located in the center of the top 21. This opening is of such a size as to admit the cover used in the receptacle shown in Fig. 1 and permit the lower edge of the cover to extend below the top 21. When the top 21, with the cover 2, is placed upon the receptacle 24 and the proper connections are made with the tubes of the cover, a fluid or powder may be directed into the receptacle 24 in substantially the same way that it is directed in the receptacle 1. (Shown in Fig. 1.) The incoming substance will pass down through the tube 5, as before, and strike the lower edge 11 of the bell 10 and be directed away from the center of the cover. The substance or fluid will be directed toward the wall of the receptacle 24 and be directed down to the bottom of the receptacle. This will cause the fluid formed by the reaction of the entering fluid through the contents of the receptacle to rise in the center of the receptacle 24 and pass out through the tube 7, as before. This form of apparatus is particularly adapted for ash determination of substances when undergoing analysis.

I have found by means of this apparatus that all of the incoming gas comes into contact with all of the contents of the receptacle, that the chemical action of the incoming fluids with the contents of the vessel is complete, and that the results obtained by the analysis are perfect.

What I claim as new, and desire to secure by Letters Patent, is—

1. In a receptacle, the combination of a means for supplying a fluid to a receptacle, a pair of tubes connected to the said receptacle, one of said tubes having a bell adapted to direct the flow of an agent entering through the other of the said tubes, the said bell having an opening leading to its connected tube.

2. In a receptacle, the combination of a tube passing into the said receptacle, a bell located on the inner end of the said tube, a disk located within the said bell and forming an annular opening for fluids escaping from the said receptacle.

3. In a crucible, the combination of means for supplying a fluid to the said receptacle, a cover having a conical flange adapted to accurately fit the said receptacle, a plurality of openings in the top of the said cover, and a means coöperating with the said flange to control the flow of fluids in the said crucible.

4. In a receptacle, the combination of means for supplying a fluid to the said receptacle, a cover having a flange adapted to fit the said receptacle and an opening, a means located in such a position relative to the flange and to the opening as to radially direct the flow of incoming fluids.

5. In a crucible, the combination of means for supplying a fluid to the said crucible, a cover adapted to accurately fit the said crucible and having a plurality of openings, a bell connected to one of said openings and having its edge located in proximity to the wall of the said crucible to direct the flow of a fluid along the wall of the crucible.

6. In a crucible, the combination of means for supplying a fluid to the said crucible, a pair of concentric tubes, means located on the end of one of said tubes for directing the flow of fluid in and out of the said crucible, a disk adapted to permit escaping fluids to pass out of the said crucible and to prevent solid bodies from passing out of the crucible.

7. In a combination with a crucible, a means for supplying a fluid to the said crucible, a means for radially directing incoming fluids along the walls of the said crucible and a perforated disk for permitting escaping fluids to leave the crucible and preventing solid bodies from passing out of the crucible.

8. In a receptacle, the combination of a pair of concentric tubes, a bell located on one of said tubes and a perforated disk located within the said bell.

9. In a receptacle, the combination of means for supplying fluids to the said crucible, a pair of tubes connected to the interior of the said receptacle, means for directing a flow of incoming fluids along the wall of the said receptacle and agitator located in one of the said tubes and adapted to stir the contents of the receptacle.

10. In combination with a cover adapted to fit a plurality of receptacles of different sizes, means for supplying a fluid to the said cover, and a means supported by the said cover for radially directing the flow of the fluid.

11. In combination with a cover adapted to fit a plurality of crucibles of different sizes, means for supplying fluids to the said cover, a means located in the center of said cover for radially directing the flow of the fluids, consisting of a flange, a bell located in proximity to the said flange, and a tube having an opening above the said bell.

In testimony whereof I have signed my name to this specification in the presence of two subscribing witnesses.

AUGUST EIMER.

Witnesses:
W. HARRES,
JACOB B. TOCH.